(12) United States Patent
Mashaal et al.

(10) Patent No.: US 8,554,998 B2
(45) Date of Patent: Oct. 8, 2013

(54) SYSTEMS, METHODS, AND COMPUTER READABLE MEDIA FOR CONFIGURING A REWRITEABLE NON-VOLATILE MEMORY FOR PRESENTATION OF MEDIA BY A SELECTED MEDIA PRESENTATION DEVICE MODEL

(75) Inventors: Adam Jeffrey Mashaal, San Francisco, CA (US); Hagai Heshes, San Jose, CA (US); Yaron Sheba, Mountain View, CA (US); Michael Scott McMurdie, Pleasanton, CA (US); Gregory Louis Stevens, Scotts Valley, CA (US); John Anthony Becker, Ocean City, NJ (US); Erez Zvi Testiler, Wilmington, DE (US); David Domenick Marini, Stockton, CA (US)

(73) Assignee: SanDisk Technologies Inc., Plano, TX (US)

( * ) Notice: Subject to any disclaimer, the term of this patent is extended or adjusted under 35 U.S.C. 154(b) by 622 days.

(21) Appl. No.: 12/624,032

(22) Filed: Nov. 23, 2009

(65) Prior Publication Data
US 2011/0093656 A1  Apr. 21, 2011

Related U.S. Application Data

(60) Provisional application No. 61/252,491, filed on Oct. 16, 2009.

(51) Int. Cl.
G06F 12/06 (2006.01)
G06F 13/10 (2006.01)

(52) U.S. Cl.
USPC .......... 711/115; 711/170; 711/E12.084; 707/705; 386/200

(58) Field of Classification Search
None
See application file for complete search history.

(56) References Cited

U.S. PATENT DOCUMENTS

| 5,636,357 | A  * | 6/1997 | Weiner ..................... 711/115 |
| 5,734,719 | A  * | 3/1998 | Tsevdos et al. ............ 700/234 |
| 6,185,574 | B1 | 2/2001 | Howard et al. |
| 6,930,730 | B2 | 8/2005 | Maxon et al. |
| 2004/0001087 | A1* | 1/2004 | Warmus et al. ............ 345/745 |

(Continued)

OTHER PUBLICATIONS

Dowsett et al., "Tau Player," University of Kent Co600 tau Music Application, (2008).

(Continued)

*Primary Examiner* — Michael Krofcheck
(74) *Attorney, Agent, or Firm* — Jenkins, Wilson, Taylor & Hunt, P.A.

(57) ABSTRACT

Systems, methods, and computer readable media for managing digital media in a memory storage device associated with a mobile smart device are disclosed. According to one aspect, the subject matter described herein includes a method for configuring a rewriteable non-volatile memory for presentation of media by a selected media presentation device model. The method includes providing a rewriteable non-volatile memory configuration interface through which a user can select at least one media file and one of a plurality of media presentation device models. and providing a rewriteable non-volatile memory configuration manager, which, in response to selection of the at least one media file and the one media presentation device model via the configuration interface, accesses a database including entries corresponding to the plurality of media presentation device models and configures a rewriteable non-volatile memory according to information retrieved from the database to allow presentation of the at least one media file when the rewriteable non-volatile memory is present in the selected media presentation device model.

39 Claims, 7 Drawing Sheets

(56) References Cited

U.S. PATENT DOCUMENTS

| | | | |
|---|---|---|---|
| 2005/0102191 A1* | 5/2005 | Heller | 705/26 |
| 2006/0088228 A1* | 4/2006 | Marriott et al. | 707/104.1 |
| 2007/0078917 A1* | 4/2007 | Edrey | 708/109 |
| 2008/0071834 A1* | 3/2008 | Bishop | 707/104.1 |
| 2008/0080835 A1* | 4/2008 | Hutten | 386/83 |
| 2008/0124053 A1* | 5/2008 | Hutten | 386/124 |
| 2008/0126705 A1 | 5/2008 | Jogand-Coulomb et al. | |
| 2008/0131086 A1* | 6/2008 | Hutten | 386/109 |
| 2008/0147375 A1* | 6/2008 | Siren et al. | 703/24 |
| 2008/0229016 A1* | 9/2008 | Waites | 711/115 |
| 2010/0223407 A1* | 9/2010 | Dong et al. | 710/70 |
| 2011/0055457 A1* | 3/2011 | Yeh | 711/103 |

OTHER PUBLICATIONS

JEDEC Standard, "Embedded MultiMediaCard (e•MMC) e•MMC/Card Product Standard, High Capacity, including Reliable Write, Boot, Sleep Modes, Dual Data Rate, Multiple Partitions Supports and Security Enhancement," JESD84-A44. Solid State Technology Association (Mar. 2009).

* cited by examiner

SYSTEMS, METHODS, AND COMPUTER READABLE MEDIA FOR CONFIGURING A REWRITEABLE NON-VOLATILE MEMORY FOR PRESENTATION OF MEDIA BY A SELECTED MEDIA PRESENTATION DEVICE MODEL

PRIORITY CLAIM

This application claims the benefit of U.S. Provisional Patent Application Ser. No. 61/252,491, filed Oct. 16, 2009; the disclosure of which is incorporated herein by reference in its entirety.

TECHNICAL FIELD

The subject matter described herein relates to systems and methods for managing files across potentially incompatible platforms. More particularly, the subject matter described herein relates to systems, methods, and computer readable media for configuring a rewriteable non-volatile memory for presentation of media by a selected media presentation device model.

BACKGROUND

Mobile telephones, cellular telephones, personal digital assistants (PDAs), portable music players, and similar devices are examples of what is herein referred to as a "mobile smart device." A mobile smart device typically has processing power for running programs and applications and may host its own operating system. As the processing power increases and the form factor of such devices is reduced, mobile smart devices blur the lines between formerly separate functions, such as personal computer, telephone, music player, pager, text messaging device, and so on. Mobile smart devices typically contain some form of volatile and non-volatile mass storage memory. One type of mass storage memory conforms to the universal serial bus (USB) mass storage device class communications protocols. Devices that support this standard are referred to as mass storage class (MSC) devices.

The USB mass storage specification does not require any particular file system to be used on conforming devices. Instead, it provides a simple interface to read and write sectors of data, much like the low-level interface used to access a hard drive. Operating systems may treat the MSC device like a hard drive and can format it with a file system if they so prefer. A popular form of mass storage memory used in mobile smart devices is the Secure Digital® or SD card co-developed by SanDisk Corporation. SD cards may be formatted with a file system. SD cards are available in a variety of form factors, including miniSD, microSD, secure digital high capacity (SDHC) cards.

There are many mobile smart devices on the market. Each mobile device has a specific set of criteria for what types of digital media that it can or cannot accommodate and where the digital media must be located within the device or within the device file system. For example, each mobile smart device may support its own particular set of file types, e.g., image files, audio files, video files, games, applications, etc. For each type, the mobile smart device may only support files having certain characteristics. For example, a mobile smart device may support video files, but only video files using a particular codec, compression method, screen size or resolution, frame rate, and so on.

Likewise, each mobile smart device may require that files of certain types be located in certain locations within the device or within the file system. For example, one type of mobile phone or cell phone may store music files in one directory, image files in another directory, video files in a third directory, etc., while another mobile phone may store all files in the root directory of the device file system. Each mobile device may have other limitations or conventions, including file naming conventions, maximum file sizes, maximum number of files that may be stored in any particular directory, and so on. Each mobile device may also support a particular file system or file systems.

Because each mobile smart device has its own particular requirements, a user wishing to transfer media or other files to the mobile smart device must be cognizant of the specific requirements and limitations of the mobile smart device. For example, a user may desire to change the ring tone of this cell phone, which uses a microSD card for mass storage. In one scenario, the user may remove the microSD card from the cell phone and place it in a card reader attached to a personal computer, use a drag and drop file manager such as Windows® Explorer® to copy an MP3 file containing the desired ring tone to the microSD card, and reinsert the microSD card into the cell phone.

However, if the cell phone does not support the MP3 format, if the user has not placed the music file in the proper location in file system supported by the microSD card, or if the user has not followed the naming convention expected by the cell phone, the user may find that the cell phone cannot find the file, does not recognize the file as a music file, or cannot play the file. Music or audio files come in a variety of file formats. The audio data may be subject to various encoding and compression schemes, and may be encapsulated within a wrapper or container format. Not only do video files come in a similar variety of encoding, compression, and encapsulation formats, video files have additional characteristics that may affect compatibility with the mobile smart device, such as video resolution, color depth, frame rate, etc.

Some mobile smart devices require the user to use proprietary file copying software that is specific to a particular mobile smart device, usually provided by the manufacturer of the mobile smart device or by third party developers. While this approach solves some of the disadvantages described above, it suffers some disadvantages of its own, in that proprietary software is a one-device solution. A user that desires to copy music, for example, onto a cell phone and a music player from different manufacturers will need to have two separate programs—one to manage files on the cell phone and another to manage files on the music player. Furthermore, if the user upgrades his or her cell phone to a new make or model, for example, the proprietary software for the old cell phone may not work for the new cell phone, requiring the user to maintain multiple programs and perhaps learn new programs every time he or she upgrades his mobile smart devices.

Accordingly, in light of these disadvantages described above, there exists a need for systems, methods, and computer readable media for configuring a rewriteable non-volatile memory for presentation of media by a selected media presentation device model.

SUMMARY

According to one aspect, the subject matter described herein includes a method for configuring a rewriteable non-volatile memory for presentation of media by a selected media presentation device model. The method includes providing a rewriteable non-volatile memory configuration interface through which a user can select at least one media file and one of a plurality of media presentation device models. and providing a rewriteable non-volatile memory configuration manager, which, in response to selection of the at least one media file and the one media presentation device model via the configuration interface, accesses a database including entries corresponding to the plurality of media presentation device models and configures a rewriteable non-volatile memory according to information retrieved from the database to allow presentation of the at least one media file when the rewriteable non-volatile memory is present in the selected media presentation device model.

According to another aspect, the subject matter described herein includes a system for configuring a rewriteable non-volatile memory for presentation of media by a selected media presentation device model. The system includes a rewriteable non-volatile memory configuration interface through which a user can select at least one media file and one of a plurality of media presentation device models; and a rewriteable non-volatile memory configuration manager, which, in response to selection of the at least one media file and the one media presentation device model via the configuration interface, accesses a database including entries corresponding to the plurality of media presentation device models and configures a rewriteable non-volatile memory according to information retrieved from the database to allow presentation of the at least one media file when the rewriteable non-volatile memory is present in the selected media presentation device model.

The subject matter described herein for configuring a rewriteable non-volatile memory for presentation of media by a selected media presentation device model may be implemented in hardware, software, firmware, or any combination thereof. As such, the terms "function" or "module" as used herein refer to hardware, software, and/or firmware for implementing the feature being described. In one exemplary implementation, the subject matter described herein may be implemented using a computer readable medium having stored thereon computer executable instructions that when executed by the processor of a computer control the computer to perform steps. Exemplary computer readable media suitable for implementing the subject matter described herein include disk memory devices, chip memory devices, programmable logic devices, and application specific integrated circuits. In addition, a computer readable medium that implements the subject matter described herein may be located on a single device or computing platform or may be distributed across multiple devices or computing platforms.

BRIEF DESCRIPTION OF THE DRAWINGS

Preferred embodiments of the subject matter described herein will now be explained with reference to the accompanying drawings, wherein like reference numerals represent like parts, of which.

DETAILED DESCRIPTION

In accordance with the subject matter disclosed herein, systems, methods, and computer readable media are provided for configuring a rewriteable non-volatile memory for presentation of media by a selected media presentation device model.

Reference will now be made in detail to exemplary embodiments of the present invention, examples of which are illustrated in the accompanying drawings. Wherever possible, the same reference numbers will be used throughout the drawings to refer to the same or like parts.

Figure 1:
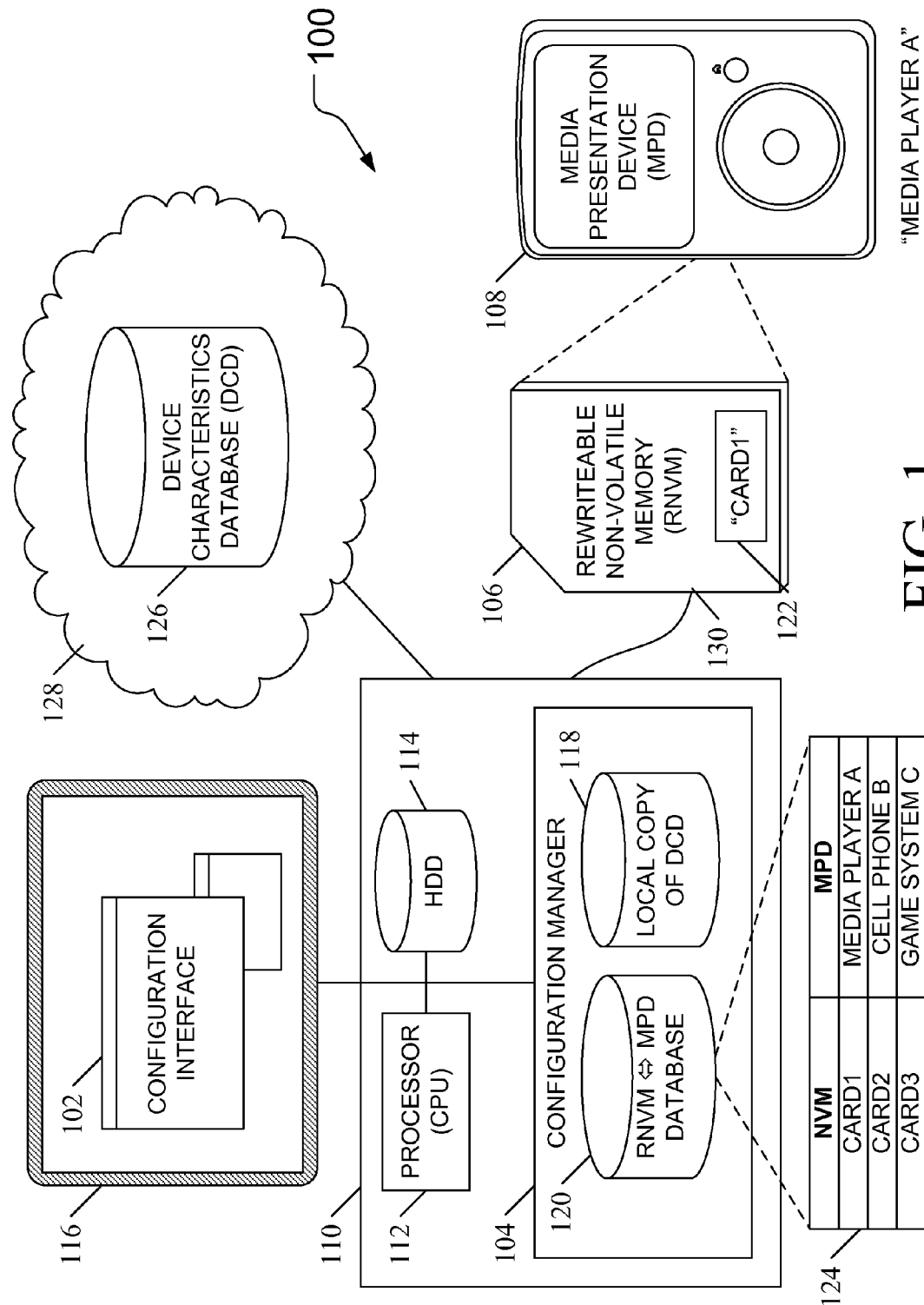
FIG. 1 is a block diagram illustrating an exemplary system for configuring a rewriteable non-volatile memory for presentation of media by a selected media presentation device model according to an embodiment of the subject matter described herein.

FIG. 1 is a block diagram illustrating an exemplary system for configuring a rewriteable non-volatile memory for presentation of media by a selected media presentation device model according to an embodiment of the subject matter described herein. In the embodiment illustrated in FIG. 1, system 100 includes a rewriteable non-volatile memory configuration interface 102 and a configuration manager 104. Using configuration interface 102, a user can select one or more media files and one of a plurality of media presentation device models. In response to the selection of the at least one media file and the one media presentation device model via configuration interface 102, configuration manager 104 accesses a database including entries corresponding to the plurality of media presentation device models and configures a rewriteable non-volatile memory (RNVM) 106 according to information retrieved from the database to allow presentation of the at least one media file when rewriteable non-volatile memory 106 is present in the selected media presentation device model. In the embodiment illustrated in FIG. 1, media presentation device (MPD) 108 is a media presentation device of the selected media presentation device model.

Rewriteable non-volatile memory 106 may take many forms. In one embodiment, rewriteable non-volatile memory 106 may be removable memory card. Examples of a removable memory card may include, but are not limited to, a non-volatile memory card, a SecureDigital (SD) card, a microSD card, a multimedia card (MMC), a subscriber identity module (SIM) card, a smart card, or any other form of removable memory card.

In one embodiment, rewriteable non-volatile memory 106 may be a removable memory storage device. Examples of a removable memory storage device may include, but are not limited to, a universal serial bus (USB) flash drive (colloquially known as a "thumb drive"), a rewriteable compact disk (CD) or digital versatile disk (DVD) in their many form factors, or other removable memory storage device.

In one embodiment, rewriteable non-volatile memory 106 may be an embedded memory. Examples of an embedded memory may include, but are not limited to, a non-volatile memory that complies with the embedded multimedia card (eMMC) specification, available on the internet at the Joint Electron Device Engineering Council (JEDEC) website at www.jedec.org, such as the product standard at www.jedec.org/download/search/JESD84-A44.pdf.

Media presentation device 108 may be any device that includes, can contain or accept, or can have attached to it a rewriteable non-volatile memory and that can display, play, or otherwise present the content of media files. Examples of a media presentation device includes, but are not limited to, a mobile communications device, such as a cell phone or mobile terminal; a personal digital assistant; a personal computing device, such as a hand-held or portable computer; a personal gaming system; a portable media player, such as the Sansa, manufactured by SanDisk Corporation; a netbook; and other devices capable of presentation of media files, such as still and video cameras, kiosks, projectors, etc.

In one embodiment, configuration manager 104 may be an application implemented in hardware, software, or a combination of hardware and software within a personal computer or other computing host 110, which may include one or more processors, RAM, and data storage devices. In the embodiment illustrated in FIG. 1, configuration manager 104 may be a software program executed by a processor 112 of host 110 that includes a hard disk drive 114 or disk array.

In one embodiment, configuration manager 104 may control or receive information from configuration interface 102. For example, configuration manager 104 may display configuration interface 102 as a graphic user interface (GUI) on a screen, terminal, or other display device 116 associated with host 110. In one embodiment, configuration interface 102 may be displayed as a window, via which the user may perform operations, such as the selection of one or more media files for transfer to a rewriteable non-volatile memory or the identification of the model of media presentation device in which the rewriteable non-volatile memory is present or into which the rewriteable non-volatile memory will later be inserted. In an alternative embodiment, configuration interface 102 may be remotely hosted and send instructions to configuration manager 104. For example, configuration interface 102 may be a web page hosted by a web server separate from host 110, which the user uses to browse and select from a list of media presentation device models. In this embodiment, configuration interface 102 may send information identifying the selected media presentation device model to configuration manager 104, which uses that information to configure rewriteable non-volatile memory 106 appropriately.

In one embodiment, configuration manager 104 may maintain one or more entities, such as databases, tables, data structures in memory, etc., for storing data. In the embodiment illustrated in FIG. 1, configuration manager 104 may maintain a device characteristics database (DCD) 118 for storing information about each of many different media presentation device models and a rewriteable non-volatile memory/media presentation device model (RNVM/MPD) database (DB) 120 for storing information about particular rewriteable non-volatile memories and the media presentation device to which each particular rewriteable non-volatile memory is associated.

In one embodiment, configuration manager 104 determines the identity of the rewriteable non-volatile memory by looking for information stored within the rewriteable non-volatile memory itself. For example, each rewriteable non-volatile memory may contain data 122, which configuration manager 104 may use to uniquely identify the rewriteable non-volatile memory. Data 122 will be described in more detail below.

In one embodiment, data 122 stored within rewriteable non-volatile memory 106 may be a file. For example, data 122 may be an extensible markup language (XML) file, a plain text file, a binary file, or other type of file. Data 122 may have a predefined filename. For example, data 122 may be an XML file named "cardinfo.xml" or other name. Data 122 may be in a predefined location within rewriteable non-volatile memory 106. For example, data 122 may be a file located in a predefined location, such as in the root directory or another directory or path, within a file system that is supported by rewriteable non-volatile memory 106. Alternatively, data 122 may exist in a particular memory block or sector within a non-volatile memory such as a FLASH memory; in a particular sector, track and side of a rewriteable CD or DVD; in a particular logical memory address within a storage device that uses logical addressing; or in a particular physical memory address within a storage device that uses physical addressing, for example. The subject matter described herein contemplates any means by which configuration manager 104 may locate and identify data 122 within the particular rewriteable non-volatile memory.

In one embodiment, data 122 within rewriteable non-volatile memory 106 may include a string of text or numbers which uniquely identify rewriteable non-volatile memory 106, although the subject matter disclosed herein is not so limited. In the embodiment illustrated in FIG. 1, for example, rewriteable non-volatile memory 106 includes data 122 which contains the string "CARD1." This string uniquely identifies rewriteable non-volatile memory 106 and enables configuration manager 104 to distinguish rewriteable non-volatile memory 106 from any other rewriteable non-volatile memory that may be connected to or detected by configuration manager 104. In one embodiment, configuration manager 104 may be responsible for generating the contents of data 122 to ensure that each rewriteable non-volatile memory is uniquely identified. Alternatively, some forms of rewriteable non-volatile memory may contain unique identifiers created during the manufacturing process. If these unique identifiers are accessible by configuration manager 104, then configuration manager 104 may simply use the pre-existing unique identifier, by itself or in combination with other information. Other schemes for uniquely identifying each rewriteable non-volatile memory are contemplated by the subject matter described herein.

In an alternative embodiment, data 122 within rewriteable non-volatile memory 106 may identify the media presentation device model directly. For example, data 122 may include the string "MEDIA PLAYER A," which configuration manager 104 may use in a query into DCD 118 to determine the information such as file characteristics and operating characteristics for MPD 108. In this embodiment, the creation and use of RNVM/MPD database 120 may be obviated.

In yet another alternative embodiment, RNVM/MPD database 120 may associate the unique identifier of the rewriteable non-volatile memory with the file and operating characteristics of the selected media presentation device model directly. In one example such embodiment, record 124 may have "CARD1" as the key and may have values that come from the corresponding entry within either local copy of DCD 118 or master copy DCD 126. In this embodiment, the creation and use of local copy of DCD 118 may be obviated under some circumstances, e.g., where access to master copy of DCD 126 is likely to be guaranteed. Thus, rather than two associations, namely "rewriteable non-volatile memory to MPD model" (using DB 120) and "MPD model to operating and file characteristics" (using DCD 118), this embodiment may use DB 120, DCD 118, or another database entirely, to make one association, namely, "rewriteable non-volatile memory to operating and file characteristics."

In one embodiment, DB 120 may include multiple records, such as record 124, each record containing an association between a uniquely identified rewriteable non-volatile memory and a media presentation device model. For example, the rewriteable non-volatile memory identified as "CARD1" (e.g., RNVM 106) has been associated with a media presentation device model identified as "PLAYER A" (e.g., MPD 108), while "CARD2" is associated with a cell phone identified as "CELL PHONE B," and "CARD3" is associated with a game system identified as "GAME SYSTEM C." In a less generic example, a SD card that has been given the unique identifier of "2983-7634-0451" might be associated with a SanDisk Sansa® FUZE™ model e200 media player, while a microSD card with ID "1003-2754-9209" might be associated with an LGVZ-5300 cell phone, and so on.

To determine the operating characteristics of MPD 108, configuration manager 104 may first determine the identity of the particular rewriteable non-volatile memory, e.g., rewriteable non-volatile memory 106, and find the record for that rewriteable non-volatile memory in database 120. For example, configuration manager 104 may determine that rewriteable non-volatile memory 106 has the unique identifier "CARD1." Configuration manager 104 may then attempt to find a record 124 within DB 120 for "CARD1." In the example illustrated in FIG. 1, configuration manager 104 determines that "CARD1" is associated with a media presentation device model called "MEDIA PLAYER A." Configuration manager 104 may then query DCD 118 to determine the operating characteristics of "MEDIA PLAYER A" media players. These operating characteristics will reflect the operating characteristics of MPD 108, since it is a "MEDIA PLAYER A" model media presentation device.

In one embodiment, configuration manager 104 may have the ability to access a master copy of a device characteristics database 126 via a network 128. In the embodiment illustrated in FIG. 1, master DCD 126 may be updated with information about new media presentation device models as such information becomes available. For example, master DCD 126 may be maintained by a third party service provider or may be a publically-available database. In one embodiment, access to master DCD 126 may be provided to the user of configuration manager 104 as part of an end user license agreement. Configuration manager 104 may request or receive updates from master DCD 126 so that its local copy DCD 118 is synchronized with master DCD 126. Local DCD 118 may contain some or all of the contents of master DCD 126.

In one embodiment, media files include digitally-encoded media files. Example media files include audio and music files, such as audio interchange file format (AIFF), MPEG-1 audio layer 3 (MP3), advanced audio coding (AAC), windows media audio (WMA), Ogg, musical instrument digital interface (MIDI), and other formats, as well as video files, such as moving picture experts group (MPEG) video, QuickTime, windows media video (WMV), RealPlayer, and other formats, and combinations of audio and video, including container files, such as resource interchange file format (RIFF), and other formats, such as small web format (SW F, formerly known as "Shockwave Flash"). Presentation of media files includes generating audio and/or video for consumption by the user.

In one embodiment, configuration manager 104 may configure rewriteable non-volatile memory 106 while it is still present within MPD 108. For example, MPD 108 may be a cell phone containing an SD card, a SIM card, etc., and also having a means for communicating data to and from host 110. In one embodiment, MPD 108 may have a USB port for connecting the cell phone to host 110, which may be a user's personal computer, or PC, for example, via a USB cable 130 or other wired (or optical) connection. In another embodiment, MPD 108 may have the ability to communicate with host 110 wirelessly, such as via infrared, Bluetooth, or other near-field communication protocol. In these embodiments, configuration manager 104 may detect the presence of MPD 108 as an entity connected to host 110, such as via a USB bus or other serial port, and may detect the presence of rewriteable non-volatile memory 106 as a device, a block of memory, a file system, or other entity accessible by configuration manager 104. In these embodiments, configuration manager 104 may configure rewriteable non-volatile memory 106 while it is still physically present within or attached to MPD 108.

In one embodiment, configuration manager 104 may configure rewriteable non-volatile memory 106 while it is removed from the MPD with which it is associated. For example, MPD 108 may be a music player having a slot which can accept an SD card or other type of removable memory card. In this scenario, the user may connect rewriteable non-volatile memory 106 to host 110 via a card reader (not shown) or other peripheral connected to host 100 that allows configuration manager 104 to access and configure rewriteable non-volatile memory 106 while it is not physically present within or attached to MPD 108.

Figure 2:
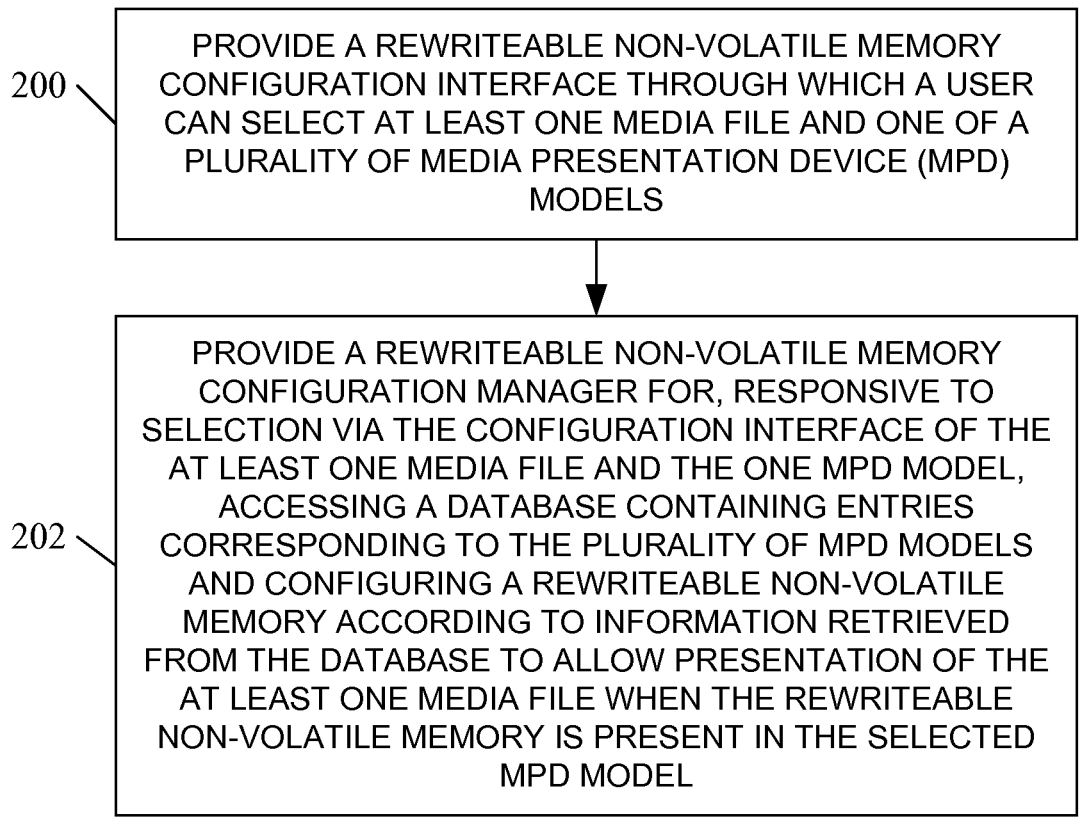
FIG. 2 is a flow chart illustrating an exemplary process for configuring a rewriteable non-volatile memory for presentation of media by a selected media presentation device model according to an embodiment of the subject matter described herein.

FIG. 2 is a flow chart illustrating an exemplary process for configuring a rewriteable non-volatile memory for presentation of media by a selected media presentation device model according to an embodiment of the subject matter described herein. This process will be described with reference to FIGS. 1 and 2.

At block 200, a rewriteable non-volatile memory configuration interface is provided through which a user can select at least one media file and one of a plurality of media presentation device models. For example, in the embodiment illustrated in FIG. 1, configuration interface 102 is presented to a user via display 116 connected to host computer 110. The user may use configuration interface 102 to select at least one media file and identify a media presentation device model.

In one embodiment, the media file or files selected may reside on a data storage entity within host 110, such as hard disk drive 114. Configuration interface 102 may present to the user a list of media files from which the user may select one or more files to be copied onto rewriteable non-volatile memory 106. The files available for selection may be presented to the user in a file and folder representation, visually similar to the representation presented by a file browser, or using any other representation.

In one embodiment, configuration interface 102 may present to the user a list of known media presentation device models from which the user may identify or select a media presentation device model. For example, in the embodiment illustrated in FIG. 1, configuration interface 102 may generate a list of known presentation device models from data stored in device characteristics database 118. As stated above, local device characteristics database 118 may be a copy of some or all of master device characteristics database 126.

At block 202, a rewriteable non-volatile memory configuration manager is provided that responds to the selection of the media file(s) and the media presentation device model by accessing a database including entries corresponding to the plurality of media presentation device models and configures a rewriteable non-volatile memory according to information retrieved from the database to allow presentation of the at least one media file when the rewriteable non-volatile memory is present in the selected media presentation device model. For example, in the embodiment illustrated in FIG. 1, configuration manager 104 responds to the selection of a media presentation device model, by accessing device characteristics database 118 to retrieve information associated with the selected media presentation device model.

The information associated with selected media presentation device model may include a list of characteristics of media files that are supported or not supported by the device, hereinafter referred to as "file characteristics." Example file characteristics include, but are not limited to, file types, media content types, encoding and/or decoding schemes, compression schemes, audio, image, or video file characteristics, container file schemes, and presentation file characteristics, to name a few.

Example audio file characteristics include, but are not limited to, the number of channels, sampling rates, and number of bits per channel, for the audio data contained within the file, as well as encoding formats, and audio compression/expansion formats used by the file or used to create the file.

Example image file characteristics include, but are not limited to, the image height and width, number of pixels, and color depth or number of bits per pixel, as well as number of colors within the image and any image compression formats used.

Example video file characteristics include, but are not limited to, video height and width, resolution, and frame rate, as well as video encoding/decoding and compression/expansion formats used.

Example presentation file characteristics include, but are not limited to, presentation file type, presentation file screen height and width, resolution, color depth, frame rate, and so on.

The information associated with the selected media presentation device model may also include operating characteristics of the selected media presentation device model. Examples of an operating characteristic includes, but are not limited to, a file system supported by the media presentation device, a convention regarding media file names expected or required by the media presentation device, an expected or required locations for media files within the media presentation device, a constraint imposed upon the size if digital media files, and a constraint imposed according to a digital rights management (DRM) policy, to name a few.

Figure 3:
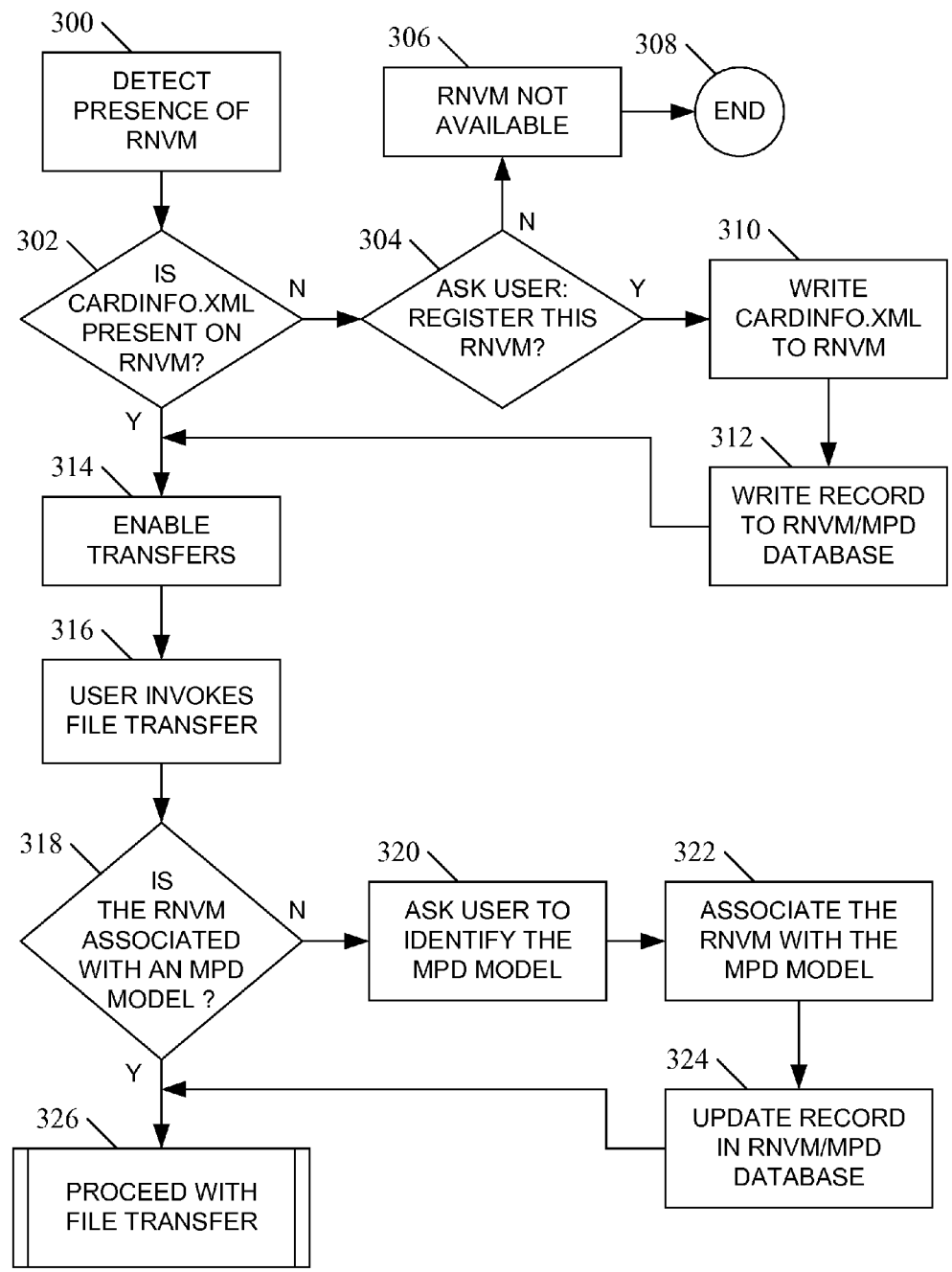
FIG. 3 is a flow chart illustrating an exemplary process for configuring a rewriteable non-volatile memory for presentation of media by a selected media presentation device model according to another embodiment of the subject matter described herein.

FIG. 3 is a flow chart illustrating an exemplary process for configuring a rewriteable non-volatile memory for presentation of media by a selected media presentation device model according to another embodiment of the subject matter described herein.

At block 300, configuration manager 104 detects the presence of rewriteable non-volatile memory 106. For example, rewriteable non-volatile memory 106 may be a removable memory card inserted into a card reader attached to host 110, a read/writeable compact disk inserted into a CD drive with read/write capability, or a USB flash drive (also called a "thumb drive") inserted into a USB port within host 110. Media presentation device 108 may be connected to host 110 using a wired connection, such as USB, or over a wireless connection, such as Bluetooth.

Configuration manager 104 may then attempt to determine whether the rewriteable non-volatile memory that has been detected is one that is known to configuration manager 104. Rewriteable non-volatile memories that are known to configuration manager 104 are herein referred to as being "registered to" configuration manager 104. In one embodiment, configuration manager 104 may place configuration data 122 into rewriteable non-volatile memories during the registration process. For example, configuration manager 104 may write a file to rewriteable non-volatile memory 106. For rewriteable non-volatile memories that do not support a file structure, configuration manager 104 may write data in the form of a physical block or sector, logical block or sector, or other form appropriate to the structure and operation of the particular rewriteable non-volatile memory.

In one embodiment, configuration manager 104 may place configuration data 122 in the form of an XML file into every rewriteable non-volatile memory that is registered to it. In one embodiment, the XML file may have a predefined name, such as "cardinfo.xml". The contents of configuration data 122 contained within the cardinfo.xml file may include one or more pieces of information useful to configuration manager 104 for determining one or more operating characteristics of the selected media presentation device model, e.g., MPD 108.

As described above, configuration data 122 within the cardinfo.xml file may include a unique identifier that is assigned to the particular rewriteable non-volatile memory. Configuration manager 104 may then use the identifier of the rewriteable non-volatile memory to identify the media presentation device model with which that rewriteable non-volatile memory is associated and use the identified media presentation device model to determine one or more operating characteristics of the media presentation device model. For example, cardinfo.xml may contain a unique identifier, such as "CARD1," which is mapped to "MEDIA PLAYER A" using DB 120, which is used to query DCD 118 to determine operating characteristics for MPD 108. Alternatively, configuration data 122 within cardinfo.xml may include information directly identifying the media presentation device model, or directly indicating operating characteristics for MPD 108, as described above.

Thus, at block 302, configuration manager 104 may access rewriteable non-volatile memory 106 to determine whether rewriteable non-volatile memory 106 already contains configuration data 122 by looking for a file named cardinfo.xml. If so, the process moves to block 314, described later below. If not, the process flow moves to block 304, in which the user may be asked whether or not to register rewriteable non-volatile memory 106. If the user chooses not to register rewriteable non-volatile memory 106, then rewriteable non-volatile memory 106 is not available for configuration (block 306) and the process ends (block 308.)

Referring again to block 304, if the user chooses to register rewriteable non-volatile memory 106, then information is placed onto rewriteable non-volatile memory 106. For example, at block 310, configuration manager 104 may write the file named cardinfo.xml into rewriteable non-volatile memory 106, and the process moves to block 312, in which configuration manager 104 creates a new entry in the DB 120 for storing information associated with the particular rewriteable non-volatile memory, e.g., rewriteable non-volatile memory 106. For example, DB 120 may contain data in a (key, value) relationship, in which the rewriteable non-volatile memory's unique identifier is the key and information related to the media presentation device model to which the rewriteable non-volatile memory is associated is the value. In one embodiment, an entry within DB 120 is created for each unique rewriteable non-volatile memory that is registered with configuration manager 104, but the value is left blank until the rewriteable non-volatile memory is associated with a particular MPD model, a process that is described below.

The process then moves to block 314 in which configuration manager 104 enables file transfers to rewriteable non-volatile memory 106. In one embodiment, file transfers are disabled under certain conditions, such as if rewriteable non-volatile memory 106 is not accessible by configuration manager 104, if rewriteable non-volatile memory 106 is accessible by configuration manager 104 but not yet registered or associated with a particular media presentation device model, or if rewriteable non-volatile memory 106 is accessible by configuration manager 104 and registered or associated with a particular media presentation device model, but configuration manager 104 does not have the means to convert the media files into a format usable by the particular media presentation device model. An example of the latter scenario is where configuration manager 104 does not have a necessary codec. If all of the prerequisite conditions are met, such as those listed above or others, configuration manager 104 may enable file transfers to rewriteable non-volatile memory 106.

At the conclusion of block 314, rewriteable non-volatile memory 106 is registered with configuration manager 104. At the same time as registration or at a later time the user may initiate a file transfer process, e.g., to copy files that are stored on host 110, such as within HDD 114, onto rewriteable non-volatile memory 106. Thus, at block 316, the user invokes a file transfer.

At block 318, configuration manager 104 determines whether the removable media card is associated with a particular media presentation device model. In one embodiment, configuration manager 104 may retrieve from DB 120 a database record associated with rewriteable non-volatile memory 106. If rewriteable non-volatile memory 106 is already associated with an MPD model, the process flow moves to block 326, described later below. If rewriteable non-volatile memory 106 is not yet associated with a particular MPD model, the process moves to block 320.

At block 320, the user is asked to identify the MPD model into which the rewriteable non-volatile memory will be placed if rewriteable non-volatile memory 106 is not currently located within MPD 108 (e.g., if rewriteable non-volatile memory 106 is currently inserted in a card reader attached to host 110) or within which the rewriteable non-volatile memory is currently located (e.g., if rewriteable non-volatile memory 106 is currently within MPD 108, which is connected to host 110 via a wired or wireless data cable or communication link).

At block 322, the removable media card is associated with the media presentation device model selected by the user in block 320. In one embodiment, the user may select from a list of available media presentation device models presented by configuration interface 102.

At block 324, the record within DB 120 for rewriteable non-volatile memory 106 may be updated to show that rewriteable non-volatile memory 106 has been associated with the media presentation device model that was selected by the user in block 322. In alternative embodiments, the operations of block 312 may be deferred until block 324. That is, creation of the DB 120 record that associates rewriteable non-volatile memory 106 to MPD 108 may not occur until block 324. In the example illustrated in FIG. 3, DB 120 may contain database record 124, which associates rewriteable non-volatile memory 106, which is identified by name "CARD1," with MPD 108, which is identified by media presentation device model identifier "MEDIA PLAYER A." Configuration manager 104 may then use "MEDIA PLAYER A" as the key in a query of DCD 118 to determine the operating characteristics of MPD 108 as well as file characteristics of files that are supported by MPD 108. In this manner, rewriteable non-volatile memory 106 may be associated with the media presentation device model which represents or describes MPD 108.

At block 326, configuration manager 104 may proceed with the file transfer. An exemplary file transfer process is illustrated in more detail in FIG. 4, described below.

Figure 4:
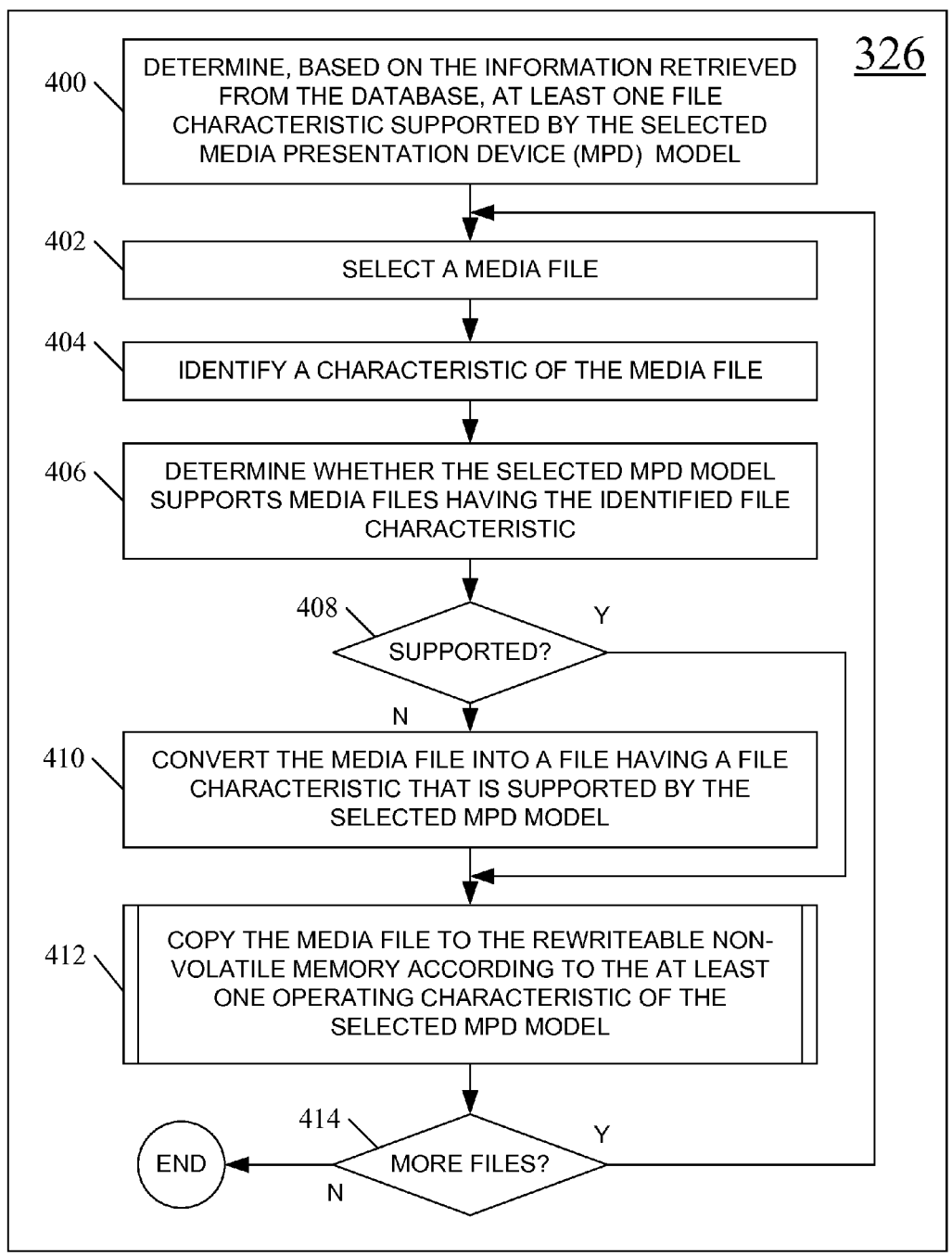
FIG. 4 is a flow chart illustrating in more detail a portion of an exemplary process for configuring a rewriteable non-volatile memory for presentation of media by a selected media presentation device model according to an embodiment of the subject matter described herein.

FIG. 4 is a flow chart illustrating in more detail a portion of an exemplary process for configuring a rewriteable non-volatile memory for presentation of media by a selected media presentation device model according to an embodiment of the subject matter described herein. FIG. 4 illustrates an exemplary process for performing a file transfer and describes in more detail the operations performed within block 326 of FIG. 3.

Referring to FIG. 4, at block 400, one or more file characteristics of files supported by the selected media presentation device model, e.g., the model of MPD 108, is retrieved from the database(s) local copy of DCD 118 and/or master copy of DCD 126. In the embodiment illustrated in FIG. 1, configuration manager 104 may query DCD 118 to determine the file characteristics associated with "MEDIA PLAYER A" media presentation device models.

At block 402, the process begins a loop in which one media file at a time is processed in preparation for copy or transfer to MPD 108. Thus, at block 402, the first media file is selected.

At block 404, the characteristics of the selected media file are identified. For example, configuration manager 104 may determine that the media file currently being processed is a MPEG video file using H.264 video compression and AAC audio encoding.

At block 406, it is determined whether the selected MPD model supports media files having the identified characteristic(s). In one embodiment, configuration manager 104 may query DCD 118 using the media presentation device model identified as the MPD model to which the rewriteable non-volatile memory, e.g., rewriteable non-volatile memory 106, has been associated and receive from DCD 118 a list of file characteristics that MPD 108 will support. For example, configuration manager 104 may query DCD 118 to determine whether or not "MEDIA PLAYER A" devices support MPEG video files using H.264 and AAC.

At block 408, if the selected MPD model supports files having the identified characteristic(s), the process goes to block 412, described below. If the selected MPD model does not support files having the identified characteristic(s), however, the process goes to block 410.

At block 410, the currently selected media file is converted into a file having file characteristics that are supported by the selected MPD model. In one embodiment, configuration manager 104 may take advantage of the software capabilities, including applications, libraries, and application programming interfaces (API), etc., provided by host 110. For example, Microsoft Windows® includes several APIs that identify the media file characteristics and provides a library of transcoding functions which will convert a file from one media file format into another media file format. Alternatively, configuration manager 104 may include its own identification and/or transcoding functions or routines.

A media file may have more than one characteristic and that media presentation devices may support files having all, some, or none of the particular characteristics. For example, MPEG video files may contain audio data that has been encoded using one of a variety of possible audio codecs. A selected MPD model may support MPEG video using AAC audio but not MPEG video using OGG audio, for example. Or, a selected MPD model may support MPEG video having a screen size of 320×480 pixels but not having a screen size of 1280×1024, and so on. Thus, the operations of blocks 404, 406, and 406 may be repeated for each identified characteristic of a file until all characteristics have been reviewed, to make sure that the selected MPD model supports the media file having that combination of characteristics.

At block 412, either the original or the converted media file is copied to the rewriteable non-volatile memory according to the at least one operating characteristic of the selected MPD model, which was determined at block 400, above. A more detailed example of this copy operation is shown in FIG. 5, described below.

At block 414, it is determined whether there are any other media files to be processed. If so, the process flow returns to block 402, and if not, the process ends.

Figure 5:
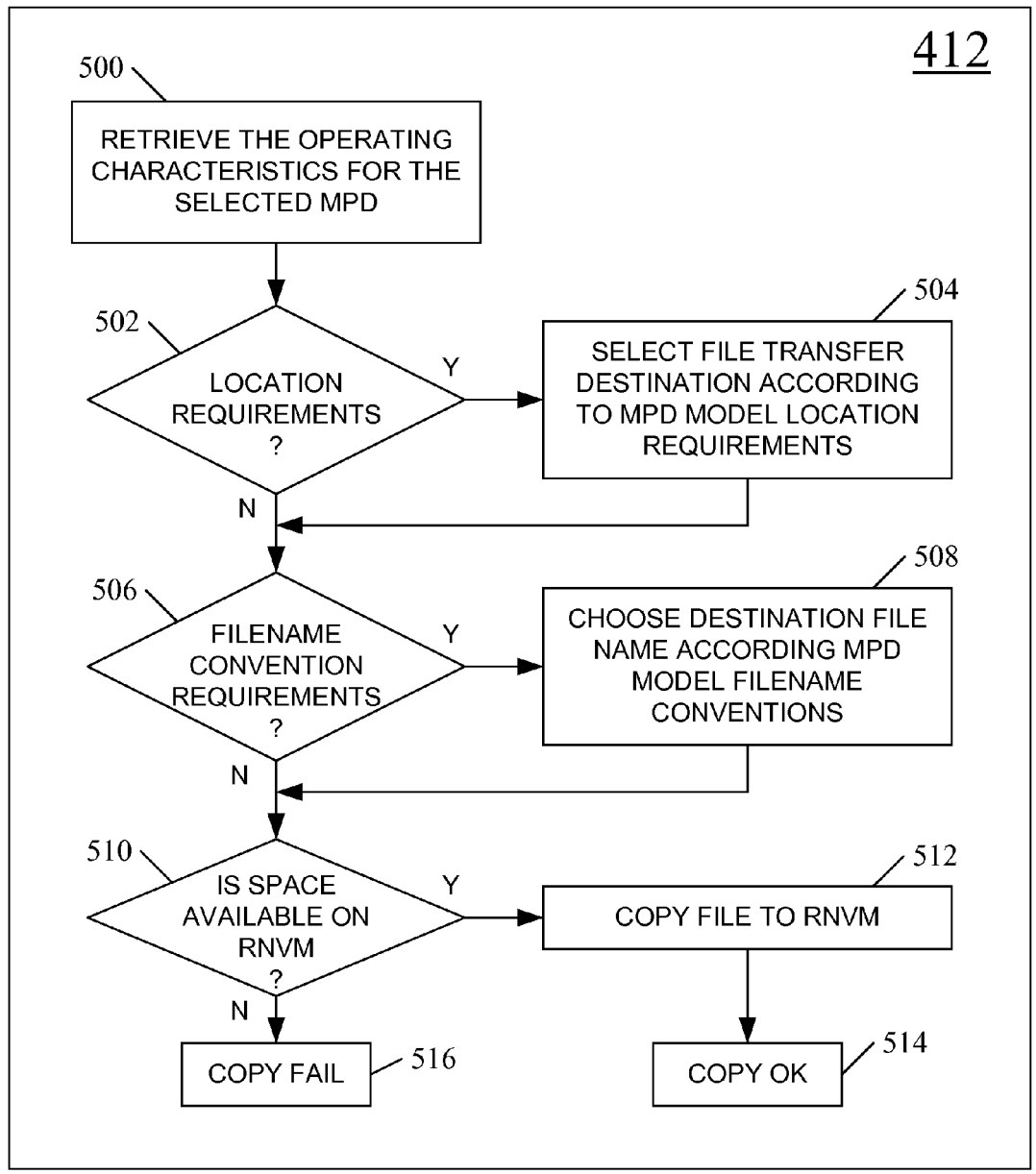
FIG. 5 is a flow chart illustrating in more detail a portion of an exemplary process for configuring a rewriteable non-volatile memory for presentation of media by a selected media presentation device model according to an embodiment of the subject matter described herein.

FIG. 5 is a flow chart illustrating in more detail a portion of an exemplary process for configuring a rewriteable non-volatile memory for presentation of media by a selected media presentation device model according to an embodiment of the subject matter described herein. FIG. 5 illustrates an exemplary process for copying a media file to the rewriteable non-volatile memory, and describes in more detail the operations performed within block 412 of FIG. 4.

At block 500, operating characteristics for the selected MPD model are retrieved. In one embodiment, configuration manager 104 may retrieve operating characteristics from DCD 118. In the example illustrated in FIG. 1, configuration manager 104 may retrieve from DCD 118 operating characteristics associated with "MEDIA PLAYER A" models.

At block 502, configuration manager 104 may determine whether MEDIA PLAYER A models have a location requirement. Example location requirements include, but are not limited to, restrictions on or expectations about where files must be located within rewriteable non-volatile memory 106, so that when rewriteable non-volatile memory 106 is inserted into (or continues to be located within, in the case of embedded memory or memory that is programmed in-place), MPD 108 knows where to find the media files. Particular models of MPDS may require that files of a certain type must be located in predefined directories. For example, MPD 108 may require that video files be located in a folder named "MyMovies," image files be located in a folder named "MyPics," etc. In another example, an MPD model may require all media files to be located in the root directory, or in a directory named "Media." In one embodiment, the MPD model may store the media files in a single directory or area, sometimes referred to as "flat" storage, yet present the files to the user of the MPD model as if the files are organized in a non-flat fashion, e.g., hierarchically. For example, the MPD model may present music files as organized by artist, album, etc. In such a scenario, configuration manager 104 may maintain a mapping between the flat file location and the apparent file hierarchy as seen by the user of MPD 108, and update the mapping as files are added to or removed from rewriteable non-volatile memory 106. In this way, configuration manager 104 presents the media files to the user of configuration manager 104 in the same manner that the MPD model presents media files to the user of the MPD model. File locations may be similarly restricted, but according to logical, block, or physical addresses, etc. Alternately, an MPD model may impose absolutely no restrictions on the location of the media files within rewriteable non-volatile memory 106.

If there are no location requirements associated with the selected MPD model, the process flow moves to block 506, described below. If there are location requirements associated with the selected MPD model, the process moves to block 504, in which a file transfer destination, e.g., within rewriteable non-volatile memory 106, is selected according the location requirements of the selected MPD model, and the process flow moves to block 506.

At block 506, configuration manager 104 may determine whether the selected MPD model has a filename convention requirement. Example filename convention requirements include limitations on the characters allowed within the filename, limitations on the length of the filename, limitations on the filename extensions used, and so on. An MPD model may even assign its own filenames, overwriting the filename of the original file. This, too, is a form of filename convention.

If there are no filename conventions associated with the selected MPD model, the process flow moves to block 510, described below. If there are filename conventions associated with the selected MPD model, the process moves to block 508, in which a destination filename is chosen according to the filename conventions of the selected MPD model, and the process flow moves to block 510.

At block 510, configuration manager 104 may check to see if there is space available within the rewriteable non-volatile memory, e.g., NVM 106. If so, the process flow moves to block 512, in which the file is copied to the rewriteable non-volatile memory. If the file copy is successful, the process flow moves to block 514, in which configuration manager 104 may notify the user or host of the copy success. However, if, at block 510, configuration manager 104 determines that there is no space still available within rewriteable non-volatile memory 106, the process moves to block 516, in which configuration manager 104 may notify the user or host that the copy was not successful.

The example operating characteristics shown in the process illustrated in FIG. 5 are for illustrative purposes and not to be construed as exclusive or limiting.

Figure 6:
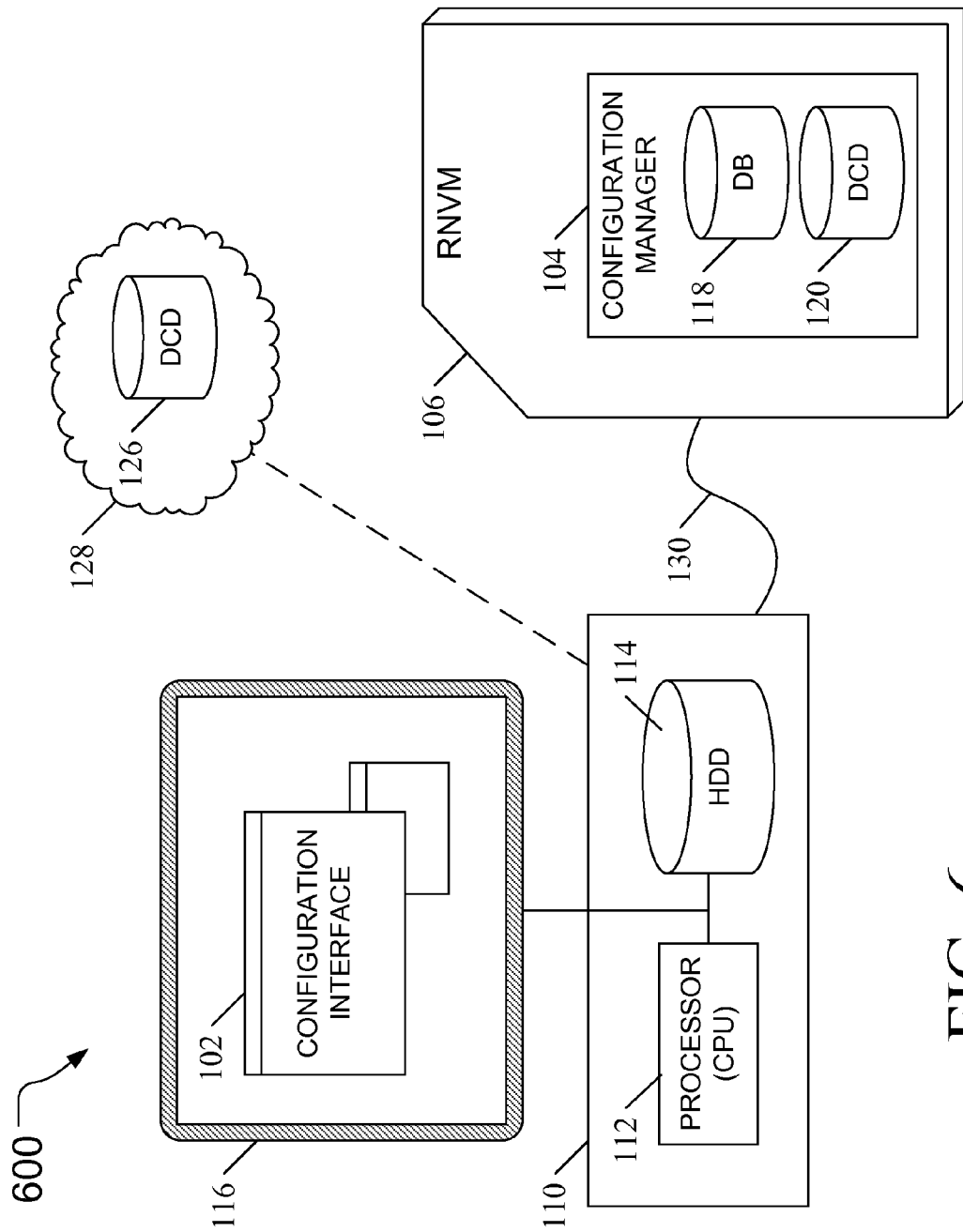
FIG. 6 is a block diagram illustrating an exemplary system for configuring a rewriteable non-volatile memory for presentation of media by a selected media presentation device model according to another embodiment of the subject matter described herein.

FIG. 6 is a block diagram illustrating an exemplary system for configuring a rewriteable non-volatile memory for presentation of media by a selected media presentation device model according to another embodiment of the subject matter described herein. In contrast to the embodiment illustrated in FIG. 1, in which configuration manager 104 is located within or is a component of host system 110, FIG. 6 illustrates an embodiment in which configuration manager 104 is located within or is a component of rewriteable non-volatile memory 106. For example, configuration manager 104 may be software or firmware present within rewriteable non-volatile memory 106 or may have a software or firmware component that is present within rewriteable non-volatile memory 106. In one embodiment, configuration manager 104 may be executed from rewriteable non-volatile memory 106; in another embodiment, configuration manager 104 may first be copied to a memory or other component of an entity other than rewriteable non-volatile memory 106, such as the MPD 108 itself, as shown in FIG. 6, or a computing platform different from MPD 108, such as host 110 in FIG. 1, for execution by the MPD 108 or host 110, for example.

Configuration manager 104 may also be or include a hardware component. In one embodiment, rewriteable non-volatile memory 106 may be a subscriber identity module (SIM) card, a smart card, or other device that includes logic or processing capability. In these embodiments, configuration manager 104 may be executed in whole or in part by rewriteable non-volatile memory 106. It will be understood that these examples above are illustrative and not limiting, and that other configurations regarding the location of configuration manager 104 and the specific entity that executes some or all of the functions of configuration manager 104 are contemplated by the subject matter described herein.

Figure 7:
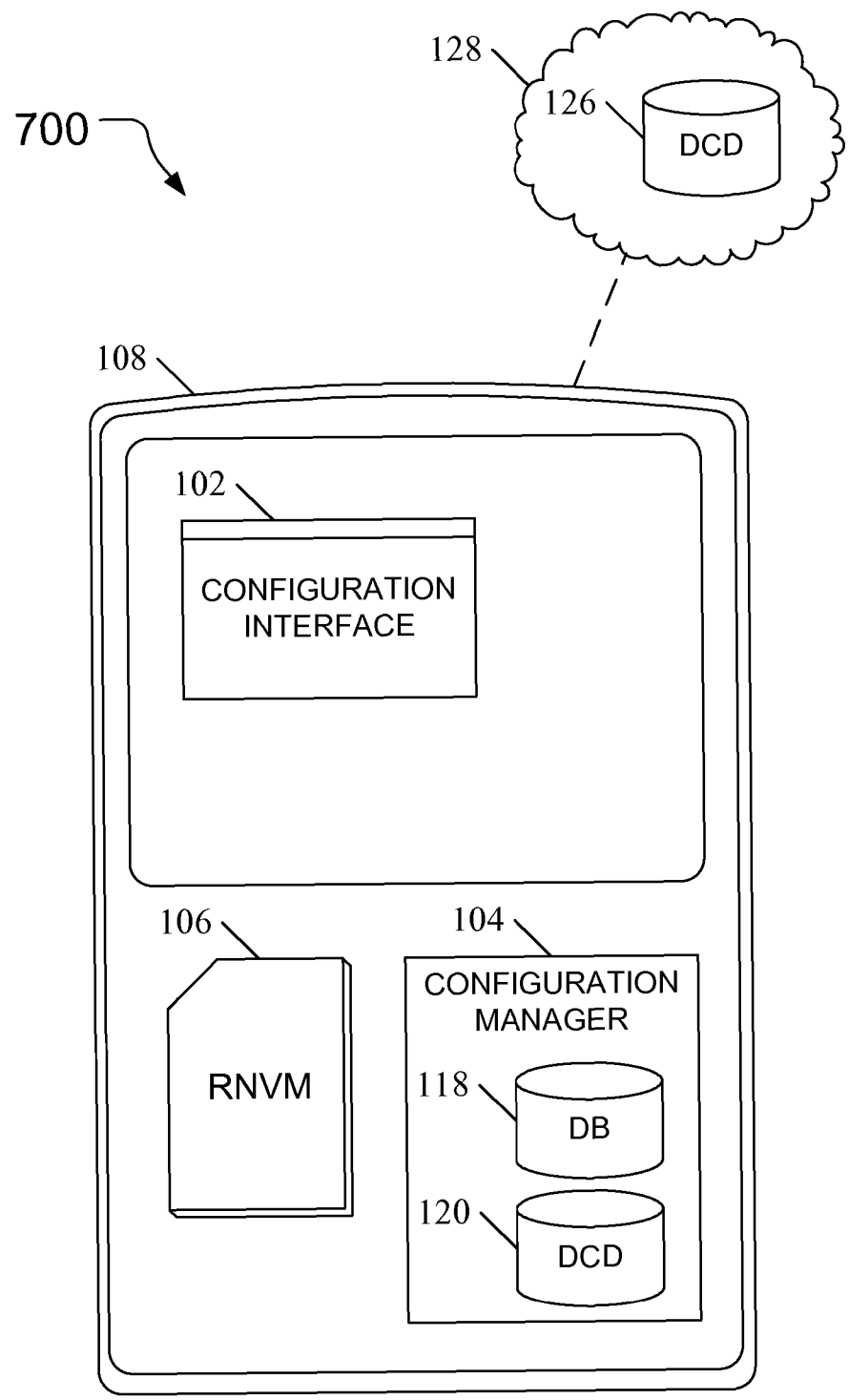
FIG. 7 is a block diagram illustrating an exemplary system for configuring a rewriteable non-volatile memory for presentation of media by a selected media presentation device model according to yet another embodiment of the subject matter described herein.

FIG. 7 is a block diagram illustrating an exemplary system for configuring a rewriteable non-volatile memory for presentation of media by a selected media presentation device model according to yet another embodiment of the subject matter described herein. In the embodiment illustrated in FIG. 7, configuration manager 104 is located within or is a component of MPD 108, all, some, or none of which may be located within rewriteable non-volatile memory 106, where all, some, or none of which may be executed from within rewriteable non-volatile memory 106. In one embodiment, local copy of DCD 118 may be updated from master copy of DCD 126 via an Internet or other network connection. In one embodiment, MPD 108 may not contain DCD 118 at all, but instead rely on a network or other connection to master DCD 126 to retrieve file and operating characteristics of MPD 108.

It will be understood that various details of the subject matter described herein may be changed without departing from the scope of the subject matter described herein. Furthermore, the foregoing description is for the purpose of illustration only, and not for the purpose of limitation.

What is claimed is:

1. A method for configuring a rewriteable non-volatile memory for presentation of media by a selected media presentation device model, the method comprising:
    providing a rewriteable non-volatile memory configuration interface through which a user can select at least one media file and one of a plurality of media presentation device models which a rewriteable non-volatile memory is currently within or attached to or which the rewriteable non-volatile memory will be placed into or attached to if the rewriteable non-volatile memory is not currently located within or attached to the media presentation device; and
    providing, on a host having a processor, a rewriteable non-volatile memory configuration manager for, responsive to selection via the configuration interface of the at least one media file and the one media presentation device model, accessing a database including entries corresponding to the plurality of media presentation device models and configuring the rewriteable nonvolatile memory according to information retrieved from the database to allow presentation of the at least one media file when the rewriteable non-volatile memory is present in or attached to the selected media presentation device model at the time of the configuration, and to allow the presentation of the at least one media file when the rewriteable non-volatile memory is present in or attached to the selected media presentation device model subsequent to the configuration,
    wherein configuring the rewriteable non-volatile memory to allow the presentation of the at least one media file when the rewriteable non-volatile memory is present in or attached to the selected media presentation device model subsequent to the configuration comprises configuring the rewriteable non-volatile memory to use a format that is incompatible with the host.

2. The method of claim 1 wherein the rewriteable non-volatile memory comprises a removable memory card.

3. The method of claim 2 wherein the removable memory card comprises a non-volatile memory card.

4. The method of claim 3 wherein the non-volatile memory card comprises one of a secure digital (SD) card, a micro SD card, and a multimedia card (MMC).

5. The method of claim 1 wherein the rewriteable non-volatile memory comprises one of an embedded multimedia card (eMMC), a universal serial bus (USB) flash drive, a compact disk (CD), and a digital versatile disk (DVD).

6. The method of claim 1 wherein the selected media presentation device comprises one of:
    a mobile communications device;
    a personal digital assistant;
    a personal computing device;
    a personal gaming system;
    a portable media player; and
    a netbook.

7. The method of claim 1 wherein the at least one media file comprises a digitally-encoded media file.

8. The method of claim 1 wherein configuring the rewriteable non-volatile memory according to information retrieved from the database comprises:
    determining, based on the information retrieved from the database, at least one operating characteristic of the selected media presentation device model; and
    for each of the at least one media file:
        identifying a characteristic of the media file;
        determining whether the selected media presentation device model supports media files having the identified characteristic;
        responsive to determining that the selected media presentation device model supports media files having the identified characteristic, copying the media file to the rewriteable non-volatile memory according to the at least one operating characteristic of the selected media presentation device model; and
        responsive to determining that the selected media presentation device model does not support media files having the identified characteristic, converting the media file into a media file having a characteristic that is supported by the selected media presentation device model and copying the media file having a characteristic that is supported by the selected media presentation device model to the rewriteable non-volatile memory according to the at least one operating characteristic of the selected media presentation device model.

9. The method of claim 8 wherein the at least one operating characteristic of the selected media presentation device model comprises at least one of:
    a file system supported by the selected media presentation device model;
    a convention regarding media file names;
    an expected location of media files within the selected media presentation device model;
    a constraint imposed upon the size of media files; and
    a constraint imposed according to a digital rights management (DRM) policy.

10. The method of claim 8 wherein the identified characteristic of the media file comprises at least one of:
    a file type;
    a media content type;
    an encoding scheme;
    a compression scheme;
    an audio file characteristic;
    an image file characteristic;
    a video file characteristic;
    a container file scheme; and
    a presentation file characteristic.

11. The method of claim 10 wherein the identified characteristic of the media file comprises an audio file characteristic and wherein the audio file characteristic includes at least one of:
- a number of channels;
- a sampling rate;
- a number of bits per sample;
- an audio encoding format; and
- an audio compression and expansion format.

12. The method of claim 10 wherein the identified characteristic of the media file comprises an image file characteristic and wherein the image file characteristic includes at least one of:
- an image height and width;
- a number of pixels within the image;
- a number of bits per pixel;
- a number of colors within the image; and
- an image compression format.

13. The method of claim 10 wherein the identified characteristic of the media file comprises a video file characteristic and wherein the video file characteristic includes at least one of:
- a video height and width;
- a video resolution;
- a video frame rate;
- a video encoding format; and
- a video compression and expansion format.

14. The method of claim 10 wherein the identified characteristic of the media file comprises a presentation file characteristic and wherein the presentation file characteristic includes at least one of:
- a presentation file type;
- a presentation file screen height and width;
- a presentation file screen resolution;
- a presentation file screen color depth; and
- a presentation file frame rate.

15. The method of claim 1 wherein configuring the rewriteable non-volatile memory according to information retrieved from the database comprises writing configuration data to the rewriteable non-volatile memory.

16. The method of claim 15 wherein the configuration data comprises a file that is written to the rewriteable non-volatile memory by the rewriteable non-volatile memory configuration manager.

17. The method of claim 15 wherein the configuration data contains information usable by the rewriteable non-volatile memory configuration manager for determining at least one operating characteristic of the selected media presentation device model.

18. The method of claim 17 wherein the configuration data uniquely identifies the rewriteable non-volatile memory and wherein the identity of the rewriteable non-volatile memory is used to identify a media presentation device model associated with the rewriteable non-volatile memory and wherein the identified media presentation device model is used to determine the at least one operating characteristic of the selected media presentation device model.

19. The method of claim 1 wherein the rewriteable non-volatile memory configuration manager is located within or is a component of at least one of:
- the selected media presentation device model;
- the rewriteable non-volatile memory; and
- a host system that is different from the selected media presentation device model and the rewriteable non-volatile memory.

20. A system for configuring a rewriteable non-volatile memory for presentation of media by a selected media presentation device model, the system comprising:
- a host having a hardware processor;
- a rewriteable non-volatile memory configuration interface through which a user can select at least one media file and one of a plurality of media presentation device models which a rewriteable non-volatile memory is currently within or attached to or which the rewriteable non-volatile memory will be placed into or attached to if the rewriteable non-volatile memory is not currently located within or attached to the media presentation device; and
- a rewriteable non-volatile memory configuration manager for, responsive to selection via the configuration interface of the at least one media file and the one media presentation device model, accessing a database including entries corresponding to the plurality of media presentation device models and configuring the rewriteable non-volatile memory according to information retrieved from the database to allow presentation of the at least one media file when the rewriteable non-volatile memory is present in or attached to the selected media presentation device model at the time of the configuration, and to allow the presentation of the at least one media file when the rewriteable nonvolatile memory is present in or attached to the selected media presentation device model subsequent to the configuration,
wherein configuring the rewriteable non-volatile memory to allow the presentation of the at least one media file when the rewriteable non-volatile memory is present in or attached to the selected media presentation device model subsequent to the configuration comprises configuring the rewriteable non-volatile memory to use a format that is incompatible with the host.

21. The system of claim 20 wherein the rewriteable non-volatile memory comprises a removable memory card.

22. The system of claim 21 wherein the removable memory card comprises a non-volatile memory card.

23. The system of claim 22 wherein the non-volatile memory card comprises one of a secure digital (SD) card, a micro SD card, and a multimedia card (MMC).

24. The system of claim 20 wherein the rewriteable non-volatile memory comprises one of an embedded multimedia card (eMMC), a universal serial bus (USB) flash drive, a compact disk (CD), and a digital versatile disk (DVD).

25. The system of claim 20 wherein the selected media presentation device comprises one of:
- a mobile communications device;
- a personal digital assistant;
- a personal computing device;
- a personal gaming system;
- a portable media player; and
- a netbook.

26. The system of claim 20 wherein the at least one media file comprises a digitally-encoded media file.

27. The system of claim 20 wherein configuring the rewriteable non-volatile memory according to information retrieved from the database comprises:
- determining, based on the information retrieved from the database, at least one operating characteristic of the selected media presentation device model; and
- for each of the at least one media file:
  - identifying a characteristic of the media file;
  - determining whether the selected media presentation device model supports media files having the identified characteristic;

responsive to determining that the selected media presentation device model supports media files having the identified characteristic, copying the media file to the rewriteable non-volatile memory according to the at least one operating characteristic of the selected media presentation device model; and responsive to determining that the selected media presentation device model does not support media files having the identified characteristic, converting the media file into a media file having a characteristic that is supported by the selected media presentation device model and copying the media file having a characteristic that is supported by the selected media presentation device model to the rewriteable non-volatile memory according to the at least one operating characteristic of the selected media presentation device model.

28. The system of claim 27 wherein the at least one operating characteristic of the selected media presentation device model comprises at least one of:
 a file system supported by the selected media presentation device model;
 a convention regarding media file names;
 an expected location of media files within the selected media presentation device model;
 a constraint imposed upon the size of media files; and
 a constraint imposed according to a digital rights management (DRM) policy.

29. The system of claim 27 wherein the identified characteristic of the media file comprises at least one of:
 a file type;
 a media content type;
 an encoding scheme;
 a compression scheme;
 an audio file characteristic;
 an image file characteristic;
 a video file characteristic;
 a container file scheme; and
 a presentation file characteristic.

30. The system of claim 29 wherein the identified characteristic of the media file comprises an audio file characteristic and wherein the audio file characteristic includes at least one of:
 a number of channels;
 a sampling rate;
 a number of bits per sample;
 an audio encoding format; and
 an audio compression and expansion format.

31. The system of claim 29 wherein the identified characteristic of the media file comprises an image file characteristic and wherein the image file characteristic includes at least one of:
 an image height and width;
 a number of pixels within the image;
 a number of bits per pixel;
 a number of colors within the image; and
 an image compression format.

32. The system of claim 29 wherein the identified characteristic of the media file comprises a video file characteristic and wherein the video file characteristic includes at least one of:
 a video height and width;
 a video resolution;
 a video frame rate;
 a video encoding format; and
 a video compression and expansion format.

33. The system of claim 29 wherein the identified characteristic of the media file comprises a presentation file characteristic and wherein the presentation file characteristic includes at least one of:
 a presentation file type;
 a presentation file screen height and width;
 a presentation file screen resolution;
 a presentation file screen color depth; and
 a presentation file frame rate.

34. The system of claim 20 wherein configuring the rewriteable non-volatile memory according to information retrieved from the database comprises writing configuration data to the rewriteable non-volatile memory.

35. The system of claim 34 wherein the configuration data comprises a file that is written to the rewriteable non-volatile memory by the rewriteable non-volatile memory configuration manager.

36. The system of claim 34 wherein the configuration data contains information usable by the rewriteable non-volatile memory configuration manager for determining at least one operating characteristic of the selected media presentation device model.

37. The system of claim 36 wherein the configuration data uniquely identifies the rewriteable non-volatile memory and wherein the identity of the rewriteable non-volatile memory is used to identify a media presentation device model associated with the rewriteable non-volatile memory and wherein the identified media presentation device model is used to determine the at least one operating characteristic of the selected media presentation device model.

38. The system of claim 20 wherein the rewriteable non-volatile memory configuration manager is located within or is a component of at least one of:
 the selected media presentation device model;
 the rewriteable non-volatile memory; and
 a host system that is different from the selected media presentation device model and the rewriteable non-volatile memory.

39. A non-transitory computer readable medium having stored thereon executable instructions that when executed by the processor of a computer control the computer to perform steps comprising:
 providing a rewriteable non-volatile memory configuration interface through which a user can select at least one media file and one of a plurality of media presentation device models which a rewriteable non-volatile memory is currently within or attached to or which the rewriteable non-volatile memory will be placed into or attached to if the rewriteable non-volatile memory is not currently located within or attached to the media presentation device; and
 providing, on a host having a processor, a rewriteable non-volatile memory configuration manager for, responsive to selection via the configuration interface of the at least one media file and the one media presentation device model, accessing a database including entries corresponding to the plurality of media presentation device models and configuring the rewriteable nonvolatile memory according to information retrieved from the database to allow presentation of the at least one media file when the rewriteable non-volatile memory is present in or attached to the selected media presentation device model at the time of the configuration, and to allow the presentation of the at least one media file when the rewriteable non-volatile memory is present in or attached to the selected media presentation device model subsequent to the configuration, wherein configuring the rewriteable non-volatile memory to allow the presentation of the at least one media file when the rewriteable non-volatile memory is present in or attached to the selected media presentation device model subsequent to the configuration comprises configuring the rewriteable non-volatile memory to use a format that is incompatible with the host.

\* \* \* \* \*